(12) United States Patent  
Bertz et al.

(10) Patent No.: US 8,892,724 B1
(45) Date of Patent: Nov. 18, 2014

(54) ASSIGNING A TYPE OF ADDRESS BASED ON EXPECTED PORT UTILIZATION

(75) Inventors: Lyle T. Bertz, Lee's Summit, MO (US); John E. Belser, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 838 days.

(21) Appl. No.: 12/900,974

(22) Filed: Oct. 8, 2010

(51) Int. Cl.
G06F 15/177 (2006.01)

(52) U.S. Cl.
USPC ........... 709/224; 709/203; 709/222; 709/246; 709/249

(58) Field of Classification Search
USPC .................. 709/203, 222, 224, 246, 249
See application file for complete search history.

(56) References Cited

U.S. PATENT DOCUMENTS

| | | | |
|---|---|---|---|
| 6,055,236 A | 4/2000 | Nessett et al. | |
| 6,353,614 B1 | 3/2002 | Borella et al. | |
| 6,353,891 B1 | 3/2002 | Borella et al. | |
| 6,496,867 B1 | 12/2002 | Beser et al. | |
| 6,523,068 B1 | 2/2003 | Beser et al. | |
| 6,567,405 B1 | 5/2003 | Borella et al. | |
| 6,697,354 B1 | 2/2004 | Borella et al. | |
| 6,708,219 B1 | 3/2004 | Borella et al. | |
| 6,731,642 B1 | 5/2004 | Borella et al. | |
| 6,781,982 B1 | 8/2004 | Borella et al. | |
| 6,822,957 B1 | 11/2004 | Schuster et al. | |
| 6,978,128 B1 | 12/2005 | Raman et al. | |
| 6,996,621 B1 | 2/2006 | Borella et al. | |
| 7,031,275 B1 | 4/2006 | Borella et al. | |
| 7,032,242 B1 | 4/2006 | Grabelsky et al. | |
| 7,113,782 B2 | 9/2006 | Lucidarme | |
| 7,171,492 B1 | 1/2007 | Borella et al. | |
| 7,218,618 B2 | 5/2007 | Greis et al. | |
| 7,286,512 B1 | 10/2007 | Borella | |
| 7,289,504 B1 | 10/2007 | Hippelainen et al. | |
| 7,573,873 B1 | 8/2009 | Borella et al. | |
| 2002/0065938 A1* | 5/2002 | Jungck et al. ................. 709/246 |
| 2004/0102195 A1 | 5/2004 | Naghian et al. | |
| 2004/0221042 A1 | 11/2004 | Meier | |
| 2005/0083969 A1 | 4/2005 | Lee et al. | |
| 2006/0140174 A1* | 6/2006 | Yeom ............................ 370/352 |
| 2006/0288092 A1* | 12/2006 | Subramaniam ............... 709/220 |
| 2007/0081512 A1 | 4/2007 | Takeda et al. | |
| 2007/0189219 A1 | 8/2007 | Navali et al. | |
| 2007/0195800 A1* | 8/2007 | Yang et al. .................... 370/401 |
| 2007/0232307 A1 | 10/2007 | Ibrahim et al. | |
| 2007/0253371 A1 | 11/2007 | Harper et al. | |
| 2007/0297377 A1 | 12/2007 | McCann et al. | |
| 2008/0080427 A1 | 4/2008 | Suh et al. | |

(Continued)

OTHER PUBLICATIONS

Boucadair et al., Anticipate IPv4 Address Exhaustion, A Critical Challenge for Internet Survival, 2009 First International Conference on Evolving Internet, 2009 IEEE.*

(Continued)

Primary Examiner — Rupal Dharia
Assistant Examiner — Van Kim T Nguyen

(57) ABSTRACT

An address assignment device may support assigning either a public address or a private address to a client device. In order to increase the number of client devices that can share a public address via network address translation, the client device may be assigned a public address when the client device's expected port utilization is at or above a port utilization threshold. However, the client device may be assigned a private address when the client device's expected port utilization is below the port utilization threshold.

16 Claims, 8 Drawing Sheets

(56) References Cited

U.S. PATENT DOCUMENTS

| | | |
|---|---|---|
| 2008/0095118 A1 | 4/2008 | Cakulev et al. |
| 2008/0205342 A1 | 8/2008 | Radhakrishnan et al. |
| 2009/0016364 A1 | 1/2009 | Krishnan |
| 2009/0197597 A1 | 8/2009 | Kotecha |
| 2009/0201852 A1 | 8/2009 | Chen |
| 2009/0245149 A1 | 10/2009 | Xia et al. |
| 2009/0257400 A1 | 10/2009 | Perras |
| 2010/0017528 A1 | 1/2010 | Awano |
| 2010/0027509 A1 | 2/2010 | Velev et al. |
| 2010/0040020 A1 | 2/2010 | Chen |
| 2010/0121944 A1* | 5/2010 | Huang et al. ............... 709/222 |
| 2010/0226350 A1 | 9/2010 | Lim et al. |
| 2010/0246509 A1 | 9/2010 | Chen |
| 2010/0278070 A1 | 11/2010 | Melia et al. |
| 2011/0019660 A1 | 1/2011 | Kumarasamy et al. |
| 2011/0038377 A1 | 2/2011 | Haddad |
| 2011/0047256 A1* | 2/2011 | Babu et al. ............... 709/223 |
| 2011/0075675 A1 | 3/2011 | Koodli et al. |
| 2011/0165892 A1 | 7/2011 | Ristich et al. |
| 2011/0211553 A1 | 9/2011 | Haddad |
| 2011/0216743 A1 | 9/2011 | Bachmann et al. |
| 2011/0249636 A1 | 10/2011 | Cherian et al. |
| 2012/0083262 A1 | 4/2012 | Dimou et al. |
| 2012/0188884 A1 | 7/2012 | Simonsson et al. |

OTHER PUBLICATIONS

K. Leung, et al., "WiMAX Forum / 3GPP@ Proxy Mobile IPv4," Independent Submission, Request for Comments: 5563, Feb. 2010.

S. Gundavelli, et al., "Proxy Mobile IPv6," Network Working Group, Request for Comments: 5213, Aug. 2008.

P. Srisuresh, et al., "IP Network Address Translator (NAT) Terminology and Considerations," Network Working Group, Request for Comments: 2663, Aug. 1999.

C. Perkins, "IP Mobility Support for IPv4," Network Working Group, Request for Comments: 3344, Aug. 2002.

WiMAX Forum, WiMAX End-to-End Network Systems Architecture (State 3: Detailed Protocols and Procedures), Release 1, V&V Draft, Aug. 8, 2006.

D. Wing, "PCP Design Considerations," PCP Working Group, Internet-Draft, Sep. 17, 2010.

M. Boucadair, Ed., et al., "IPv4 Connectivity Access in the Context of IPv4 Address Exhaustion: Port Range based IP Architecture," Network Working Group, Internet-Draft, Jul. 3, 2009.

J. Sutter, "We're running out of internet addresses," http://edition.cnn.com/2010/TECH/innovation/07/23/internet.addresses/?hpt=Sbin, printed from the World Wide Web, CNN, Jul. 23, 2010.

GoMo News, "Mobile devices, IPv4 and the death of the Internet," http://www.gomonews.com/mobile-devices-ipv4-and-the-death-of-the-internet/, printed from the World Wide Web, published Jul. 26, 2010.

The Week, "The looming IP-address shortage: A Crisis for the internet age," http://theweek.com/article/index/205397/the-looming-ip-address-shortage-a-crisis-for-the-i . . . , printed from the World Wide Web, posted Jul. 27, 2010.

Office Action for U.S. Appl. No. 12/873,986 mailed Jul. 17, 2012, 32 pages.

Office Action for U.S. Appl. No. 12/873,993 mailed Aug. 10, 2012, 30 pages.

Office Action for U.S. Appl. No. 12/873,986 mailed Nov. 21, 2012, 26 pages.

Final Office Action for U.S. Appl. No. 12/873,986 mailed Mar. 26, 2013, 17 pages.

Final Office Action for U.S. Appl. No. 12/873,993 mailed Jan. 17, 2013, 19 pages.

* cited by examiner

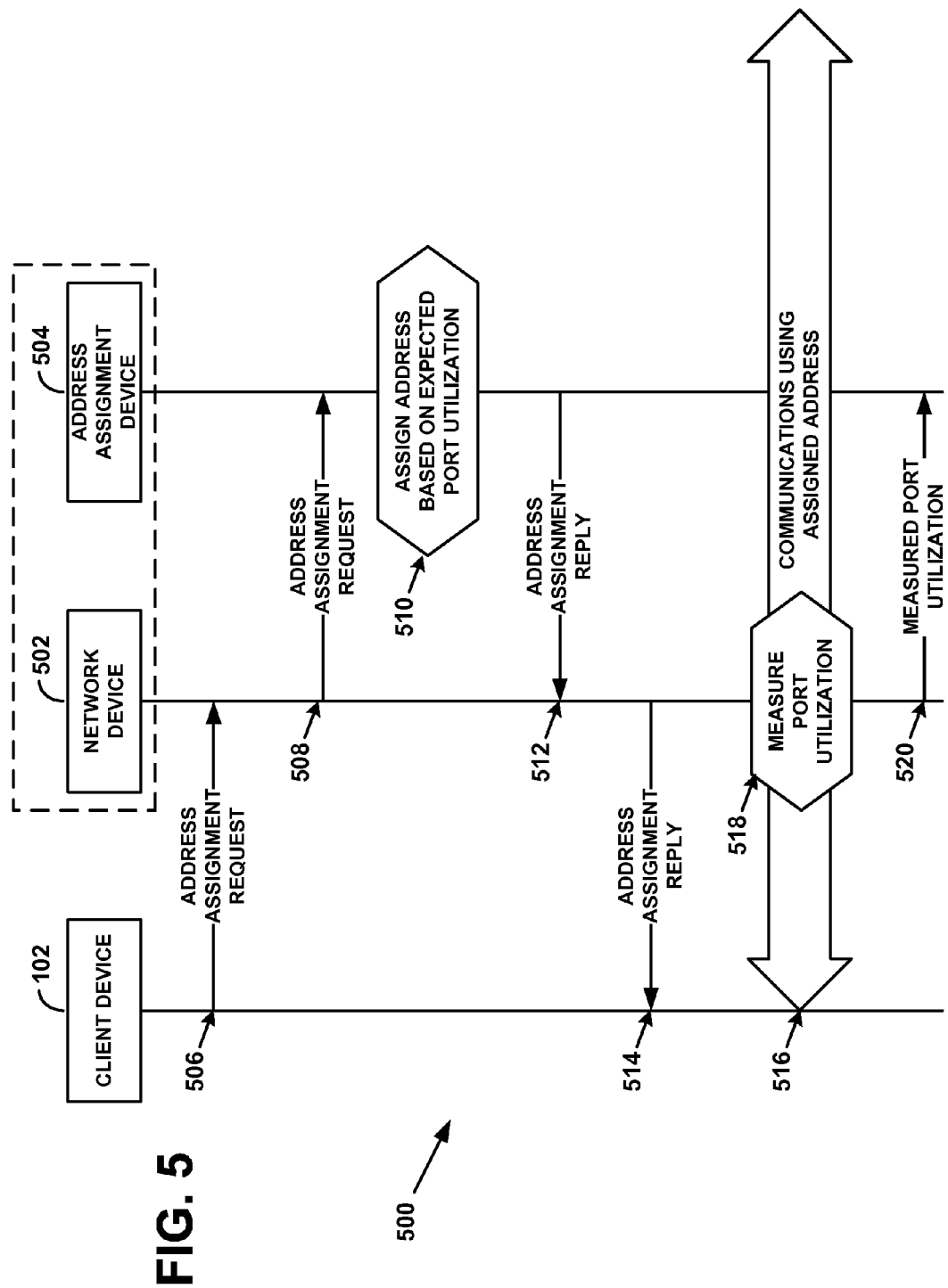

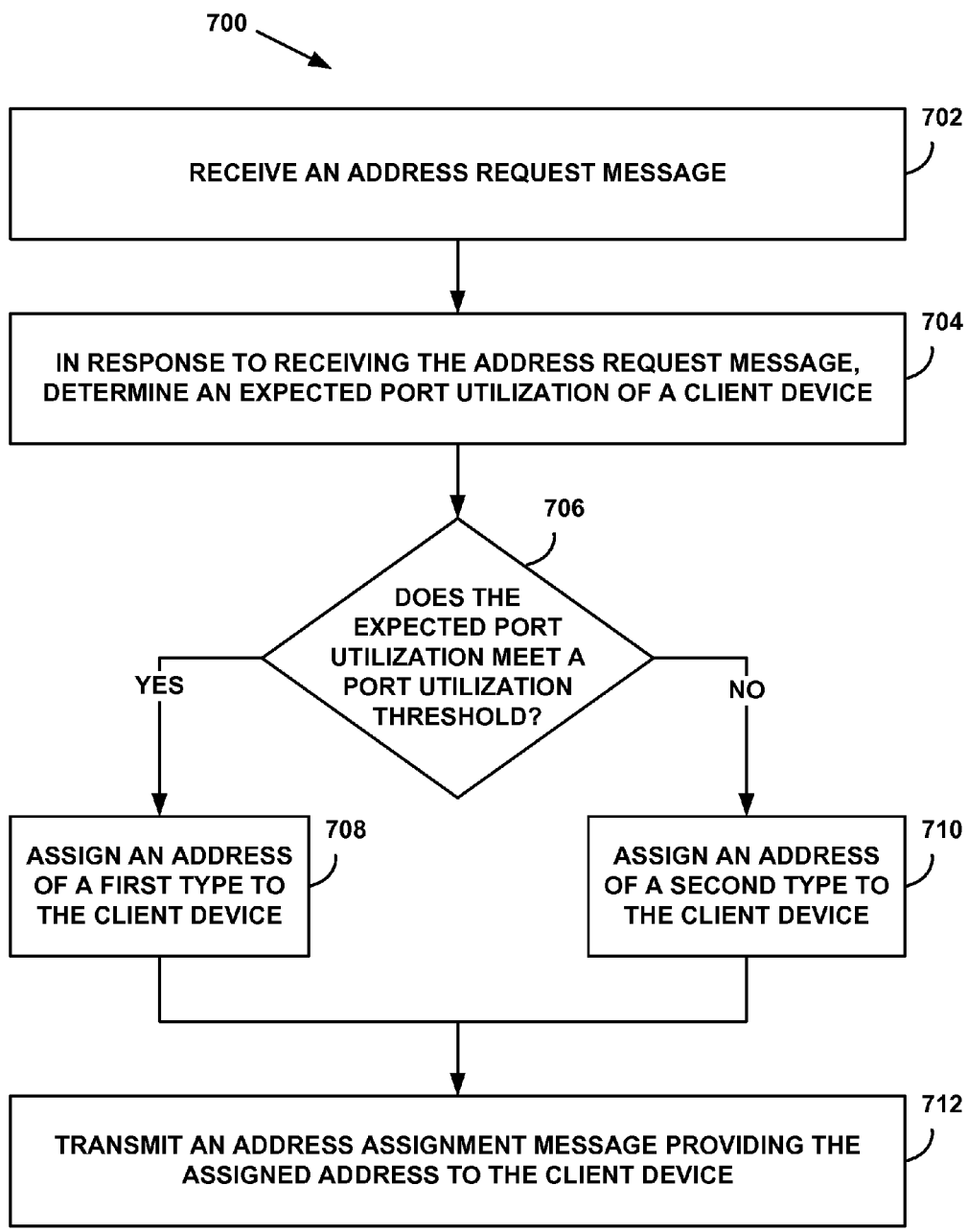

ASSIGNING A TYPE OF ADDRESS BASED ON EXPECTED PORT UTILIZATION

BACKGROUND

In theory, the Internet Protocol version 4 (IPv4) is capable of uniquely addressing over 4 billion networked devices simultaneously. However, inefficient address allocation schemes of the past, as well as the rapid, worldwide proliferation of Internet-enabled devices, have led to the near-exhaustion of IPv4 addresses. IP version 6 (IPv6) has been proposed as a replacement for IPv4, and provides a much larger address space. However, in order to upgrade a network to IPv6, most of the network's client devices, routers, gateways, and application servers would need to support or interoperate with IPv6. Even if such an upgrade is technically feasible, the cost of the upgrade, including the cost of training network administrators to understand and properly manage IPv6 devices, could be significant. Therefore, it is likely that IPv4 will continue to be used in the near future.

OVERVIEW

In order to extend the lifespan of IPv4 (hereafter "IP"), network address translation (NAT) may be used. At a high level, a NAT device allows a plurality of client devices to share one or more public IP addresses. These client devices may be allocated private IP addresses that are non-routable within the public Internet. For a packet transmitted by one of these client devices, the NAT device may translate the packet's private source IP address to one of the shared public IP addresses. As part of the translation process, the NAT device may also change the packet's client port to a temporarily-allocated port at the NAT device. For a packet traveling in the opposite direction, the translations may occur in reverse (e.g., the NAT device may translate the shared public destination IP address to the client device's private IP address and the temporarily-allocated port to the client port). Thus, instead of assigning a dedicated public IP address to each client device, NAT allows multiple client devices to share a single public IP address.

However, there are a limited number of ports per shared public IP address at the NAT device. Thus, the number of client devices that can share each public IP address is restricted by the port utilization of these client devices. For example, the Transmission Control Protocol (TCP) and the User Datagram Protocol (UDP) both allow up to about 65536 ports to be used concurrently with an IP address. If each client device is expected to use only 10 ports concurrently, approximately 6553 client devices could be supported by a single shared public IP address. However, if each client device is expected to use 1000 ports concurrently, then only approximately 65 client devices could be supported by the same address. As a result, client devices that use a large number of ports concurrently may consume a disproportionate amount of resources at a NAT device.

Further, not all NAT devices are capable of transparently supporting certain applications. Some application-layer protocols, such as the Session Initiation Protocol (SIP) and the Real-Time Streaming Protocol (RTSP), embed IP addresses and port numbers in their application payloads. Therefore, in order to adequately support these types of protocols, a NAT device may examine the application payloads of packets and translate any embedded IP addresses or port numbers as deemed appropriate. Such functionality may be referred to as an application layer gateway (ALG). But, as new protocols that require ALGs are developed, NAT devices may not be updated with these new ALGs. Further, if a protocol encrypts embedded IP addresses or port numbers, it may not be possible for an ALG to properly support the protocol.

Thus, an address assignment device that is capable of assigning either a public IP address or a private IP address to a client device may attempt to balance the tradeoffs of assigning a public IP address (thus avoiding NAT and the associated drawbacks of NAT) versus assigning a private IP address (using NAT, but potentially doing so in an inefficient fashion). The embodiments herein accommodate these factors by taking into account the expected transport-layer port utilization of a client device (e.g., the extent to which the client device is expected to make concurrent use of multiple transport-layer ports), and using this expected port utilization to determine whether to assign the client device a public IP address or a private IP address.

Accordingly, an address assignment device, such as an access gateway, home agent, Dynamic Host Configuration Protocol (DHCP) server, or Authentication, Authorization, and Accounting (AAA) server, may be provisioned with pools of both public IP addresses and private IP addresses. Thus, the address assignment device may be capable of assigning either a public IP address or a private IP address to a given client device. If the address assignment device assigns a private IP address to the given client device, NAT may then be applied to the given client device's communications. In order to determine whether to assign a given client device a public or private IP addresses, the address assignment device may consider the given client device's expected port utilization.

If this expected port utilization is high (e.g., at or above a port utilization threshold), the address assignment device may assign the given client device a public IP address. However, if the expected port utilization is low (e.g., below the port utilization threshold), the address assignment device may assign the given client device a private IP address. By doing so, the address assignment device may allow a greater number of client devices to concurrently use a shared public IP address.

This expected port utilization may be based on the given client device's historical port utilization. Thus, the address assignment device may store, or have access to, information related to the given client device's past concurrent port utilization, and may use this information to determine the given client device's expected future port utilization.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

BRIEF DESCRIPTION OF THE DRAWINGS

FIG. 5 is a third message flow, in accordance with an example embodiment;

FIG. 7 is a second flow chart, in accordance with an example embodiment.

DESCRIPTION

I. Network Architecture

Figure 1:
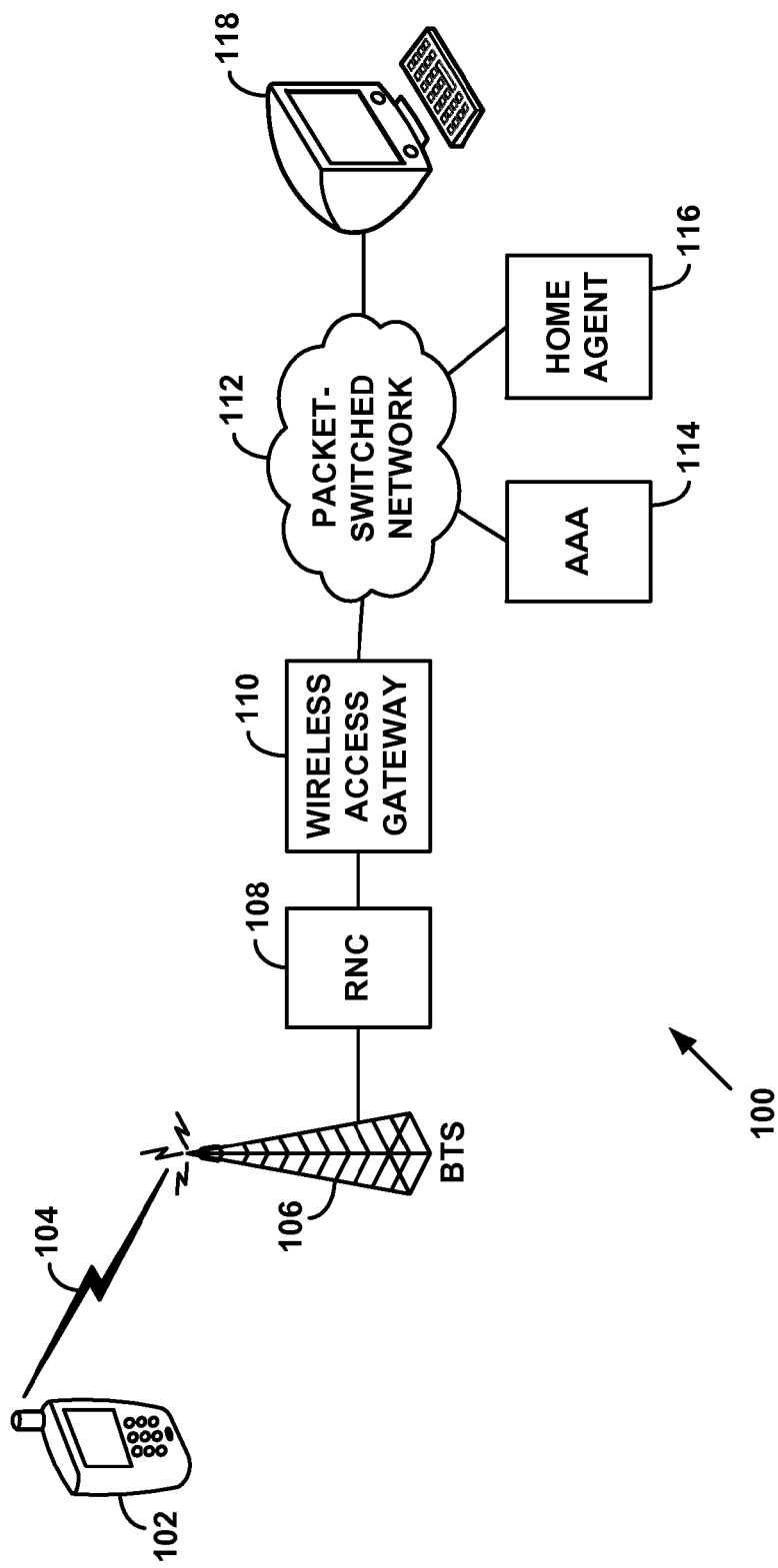
FIG. 1 depicts an access network, such as a cellular wireless access network, in accordance with an example embodiment.
Figure 2:
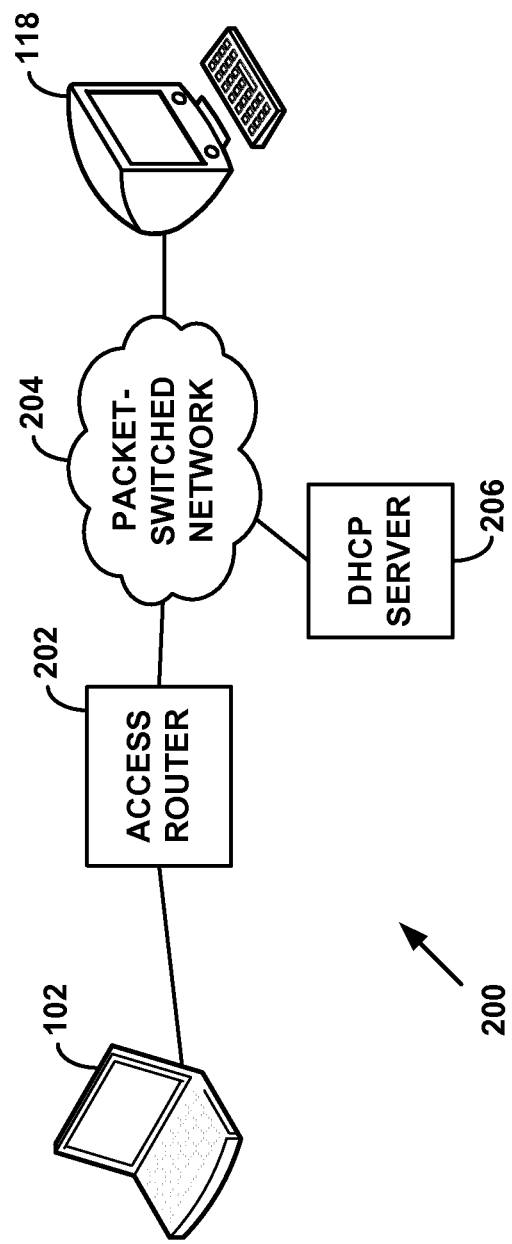
FIG. 2 depicts another type of access network, such as a local area network, in accordance with an example embodiment.

FIGS. 1 and 2 are simplified block diagrams of communication systems 100 and 200, in which example embodiments can be employed. In both of communication systems 100 and 200, an address assignment device may operate according to the embodiments disclosed herein to increase the number of client devices that can share a public address. However, other communications systems, arranged differently, could also support these embodiments.

Communication system 100 is an example wide-area wireless access network, comprising radio access network (RAN) devices, as well as devices that may be placed either inside or outside of a RAN. A client device 102, which may be a wireless communication device, may communicate over an air interface 104 with a base transceiver station (BTS) 106. BTS 106, in turn, may be coupled to or integrated with a radio network controller (RNC) 108. Transmissions over air interface 104 from BTS 106 to client device 102 may represent a "forward link" to the client device. Conversely, transmissions over air interface 104 from client device 102 to BTS 106 may represent a "reverse link" from the client device. Air interface 104 may operate according to code division multiple access (CDMA), Worldwide Interoperability for Microwave Access (WIMAX®), Universal Mobile Telecommunications System (UMTS®), Long Term Evolution (LTE®), IDEN®, 802.11 (Wifi), or other technologies now known or developed in the future.

RNC 108, alone or in conjunction with other devices, may act to control assignment of air interface traffic channels, and may provide access to wireless circuit-switched services such as circuit-voice and circuit-data services. RNC 108 may also be connected with a wireless access gateway 110. Wireless access gateway 110, in turn, may provide connectivity with a packet-switched network 112, such as the Internet and/or a wireless carrier's private core packet-network. Examples of wireless access gateways include CDMA packet-data serving nodes, WIMAX® access serving node gateways, LTE® packet data network gateways, LTE® serving gateways, and so on. Nodes on packet-switched network 112 may include, by way of example, an authentication, authorization, and accounting (AAA) server 114, a mobile-IP home agent 116, and a remote computer 118.

After acquiring a traffic channel over air interface 104, client device 102 may transmit a request to wireless access gateway 110 for a connection to packet-switched network 112. Then, during or following authentication of client device 102 by AAA server 114, client device 102 may be assigned an IP address by wireless access gateway 110, AAA 114, or home agent 116, and may thereafter engage in packet-data communications with entities such as remote computer 118. The assigned IP address may be either a public or private IP address, and may be selected based on policy logic executing at wireless access gateway 110, AAA 114, or home agent 116.

For purposes of clarity and illustration, any device that may assign an address to a client device may be referred to as an address assignment device. Thus, wireless access gateway 110, AAA 114, or home agent 116 may be address assignment devices. Further, devices that may forward, route, or otherwise transport IP packets to or from client devices may be referred to as network routing devices. Accordingly, BTS 106, RNC 108, wireless access gateway 110 and home agent 116 may be network routing devices.

Communication system 200 is another example of an access network. In this communication system, a client device 102, which may be either a wireless or wireline device, may communicate with an access router 202. (It should be noted that the use of the same reference numeral for client device 102 in both FIGS. 1 and 2 does not imply that such a client device is required to be operable on multiple types of networks.) Preferably, access router 202 is capable of receiving IP packets, storing these IP packets, and forwarding the stored IP packets between client device 102 and other networked entities, such as remote computer 118. Access router 202 may also use routing protocols to update and maintain routing tables upon which forwarding decisions can be made. Additionally, access router 202 may provide connectivity with a packet-switched network 204, such as the Internet, an enterprise network, a residential network, and/or some form of backbone network.

A DHCP server 206 may be coupled to packet switched network 204. It should be understood that DHCP server 206 may be configured with one or more pools of IP addresses that can be assigned to client devices. In the arrangement of FIG. 2, DHCP server 206 may be an address assignment device, while access router 202 may be a network routing device.

Thus, client device 102 may establish an initial communication path with access router 202. Via this path, client device 102 may request an IP address assignment by transmitting an address assignment request to access router 202. Access router 202 may forward this address assignment request to DHCP server 206, which, in turn, may assign an available IP address to client device 102. The assigned IP address may be either a public or private IP address, and may be selected based on policy logic executing at DHCP server 206 (e.g., DHCP server 206 may assign private IP addresses to some client devices and public IP addresses to others). In order to provide client device 102 with the assigned IP address, DHCP server 206 may transmit this IP address in an address assignment reply to client device 102. This address assignment reply may traverse access router 202 on its way to client device 102. Once client device 102 has received its assigned IP address, client device 102 may use this IP address when communicating with other entities.

The depictions of both FIGS. 1 and 2 are illustrative. Therefore, in a communication system, there could be more or fewer of each element than is shown, and some elements may be omitted altogether. Additionally, other types of elements not shown may be present. Further, any of these elements may be combined with one another, physically or logically, or distributed across multiple physical devices. For example, an address assignment device, such as DHCP server 206, may be combined with a network routing device, such as access router 202. Thus, the particular arrangements shown in FIGS. 1 and 2 should not be viewed as limiting with respect to the present invention.

Figure 3:
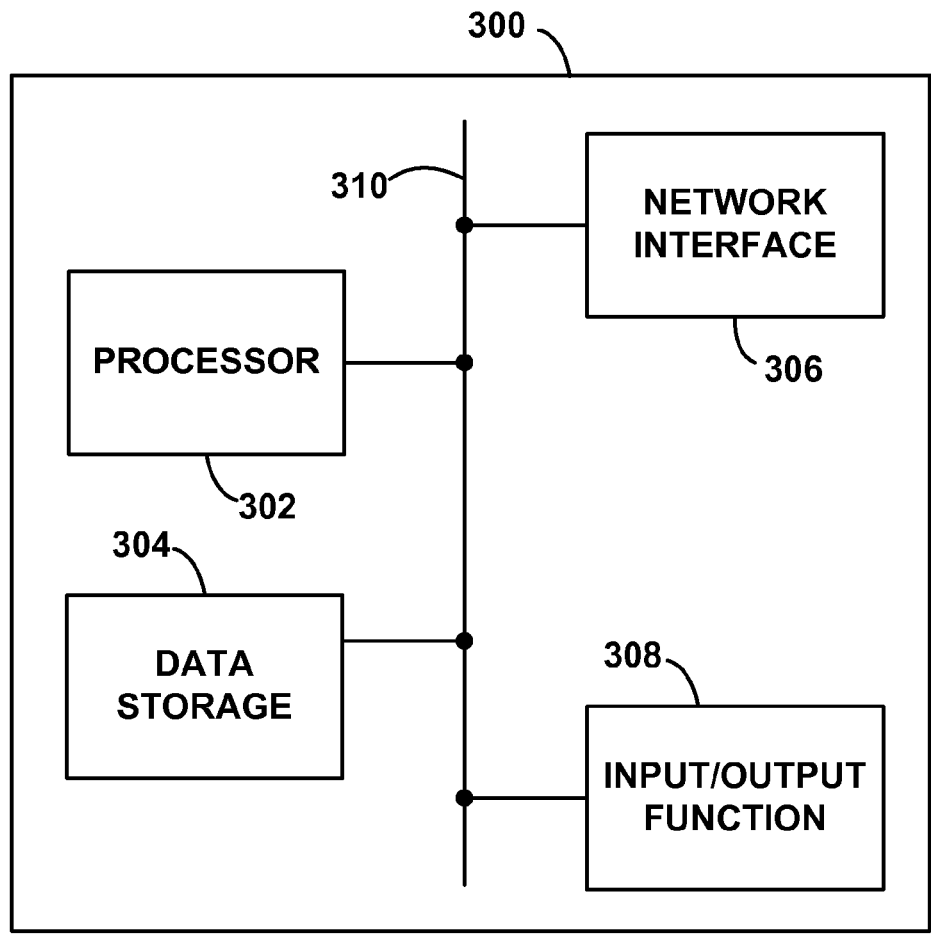
FIG. 3 is a block diagram of an address assignment device, in accordance with an example embodiment.

FIG. 3 is a simplified block diagram exemplifying an address assignment device 300, and illustrating some of the functional components that would likely be found in an address assignment device arranged to operate in accordance with the embodiments herein. Example address assignment device 300 could be any type of device capable of assigning addresses, such as a wireless or wireline access gateway, AAA server, home agent, or DHCP server.

It should be noted that an address assignment device may operate in accordance with the embodiments herein even if the address assignment device interacts with another device to determine address assignment. For instance, a home agent may assign addresses to client devices from a local pool on the home agent, or via an AAA server. But even if the home agent assigns addresses via the AAA server, the home agent may still be considered an address assignment device.

Example address assignment device 300 preferably includes a processor 302, data storage 304, a network interface 306, and an input/output function 308, all of which may be coupled by a system bus 310 or a similar mechanism. Processor 302 preferably includes one or more central processing units (CPUs), such as one or more general purpose processors and/or one or more dedicated processors, such as application specific integrated circuits (ASICs) or digital signal processors (DSPs), etc.

Data storage 304, in turn, may comprise volatile and/or non-volatile data storage and can be integrated in whole or in part with processor 302. Data storage 304 preferably holds program instructions, executable by processor 302, and data that is manipulated by these instructions to carry out the various methods, processes, or functions described herein. Alternatively, these methods, processes, or functions can be defined by hardware, firmware, and/or any combination of hardware, firmware and software. By way of example, the data in data storage 304 may contain program instructions executable by processor 302 to carry out any of the methods, processes, or functions disclosed in this specification or the accompanying drawings.

Network interface 306 may take the form of a wireline connection, such as an Ethernet, Token Ring, or T-carrier connection. Network interface 306 may also take the form of a wireless connection, such as IEEE 802.11 (Wifi), BLUETOOTH®, or a wide-area wireless connection. However, other forms of physical layer connections and other types of standard or proprietary communication protocols may be used over network interface 306. Furthermore, network interface 306 may comprise multiple physical interfaces.

Input/output function 308 may facilitate user interaction with example address assignment device 300. Input/output function 308 may comprise multiple types of input devices, such as a keyboard, a mouse, a touch screen, and so on. Similarly, input/output function 308 may comprise multiple types of output devices, such as a monitor, printer, or one or more light emitting diodes (LEDs). Additionally or alternatively, example address assignment device 300 may support remote access from another device, via network interface 306 or via another interface (not shown), such an RS-232 or Universal Serial Bus (USB) port.

II. Addresses, Ports, and NAT

In order to appreciate some of the nuances of address assignment, port usage, and NAT, this section provides an illustrative overview of these topics, directed to example embodiments of the present invention.

a. Addresses

An IP address may comprise a sequence of four bytes (octets), and is usually expressed in a dotted-decimal notation. Thus, each byte may be represented by a number between 0 and 255 (inclusive), with adjacent numbers separated by a decimal point. Examples of IP addresses in dotted-decimal notation include 128.153.4.3, 192.168.1.193, and 224.0.1.255.

Certain ranges of IP addresses are designated as private IP address ranges. Thus, each IP address appearing in this range may be a private IP address, and thus unroutable in the public Internet. Some of these ranges include 10.0.0.0-10.255.255.255, 172.16.0.0-172.31.255.255, and 192.168.0.0-192.168.255.255. Most of the remaining IP addresses are designated as public IP addresses. However, there are some blocks of IP addresses that are reserved for other uses, such as the multicast IP address space of 224.0.0.0-239.255.255.255, and the "class E" reserved IP address space of 240.0.0.0-255.255.255.255. Thus, IP addresses may be divided into several types, two of which are public IP addresses and private IP addresses.

Address assignment devices, such as wireless access gateways, AAA servers, home agents, or DHCP servers, may be configured with one or more pools of IP addresses. Each pool comprises a list of individual IP addresses and/or one or more ranges of IP addresses. Some pools may contain only private IP addresses while other pools may contain only public IP addresses. Based on some form of policy, an address assignment device may assign an IP address to a given client device from a particular pool. For instance, the pool may be chosen based on the identity (e.g., Ethernet address or Mobile Identification Number) of the client device, the utilization of the pools configured at the addresses assignment device, the time of day, or some other criteria.

Regardless of how they are grouped together or assigned, IP addresses may be used by client devices to communicate with correspondent nodes. In particular, IP addresses may be encoded in packet headers (e.g., in IP headers) to designate the source and destination endpoints of a packet.

b. Ports

In addition to IP addresses, headers in packets may contain transport-layer port numbers (hereafter "ports"). Ports are typically 16-bit fields in transport-layer packet headers that are expressed in numeric format. Transport-layer protocols, such as TCP and UDP, may make use of ports to identify protocols, applications, processes and/or threads of execution operable at an endpoint. For example, a web browser may comprise multiple threads of execution, each providing an instance of the web browser. In order to uniquely identify these instances, each instance may use a client unique port for a given communication session. Thus, one instance of the web browser may be communicating using client port 1024 and another instance of the web browser may be communicating using client port 1025. When the first instance completes its communication session and begins a new communication session, the first instance may use a new client port, e.g., 1026. Typically, the client device's operating system seeks to ensure that each communication session involving the client device uses a unique port.

When a client device is assigned a private IP address, this assigned private IP address may be translated to a public IP address so that the client device can communicate with other devices on public networks. To facilitate this translation, a NAT device may be placed between the client device and these other devices.

c. NAT

NAT devices typically translate the addresses in IP packets between a dedicated private IP address assigned to a client device and a shared public IP address. For a packet transmitted by the client device, the NAT device may translate the packet's source address from the client device's assigned private IP address to the shared public IP address. For packets transmitted to the client device, the NAT device may translate the packet's destination address from the shared public IP address to the client device's assigned private IP address. The client device may or may not be aware of the shared public IP address, and may or may not be aware that the translation is taking place. By allowing client devices to share public IP addresses, rather than assign these IP addresses to client devices in a dedicated fashion, network service providers can use a limited number of public IP addresses to serve a larger number of client devices.

Figure 4A:
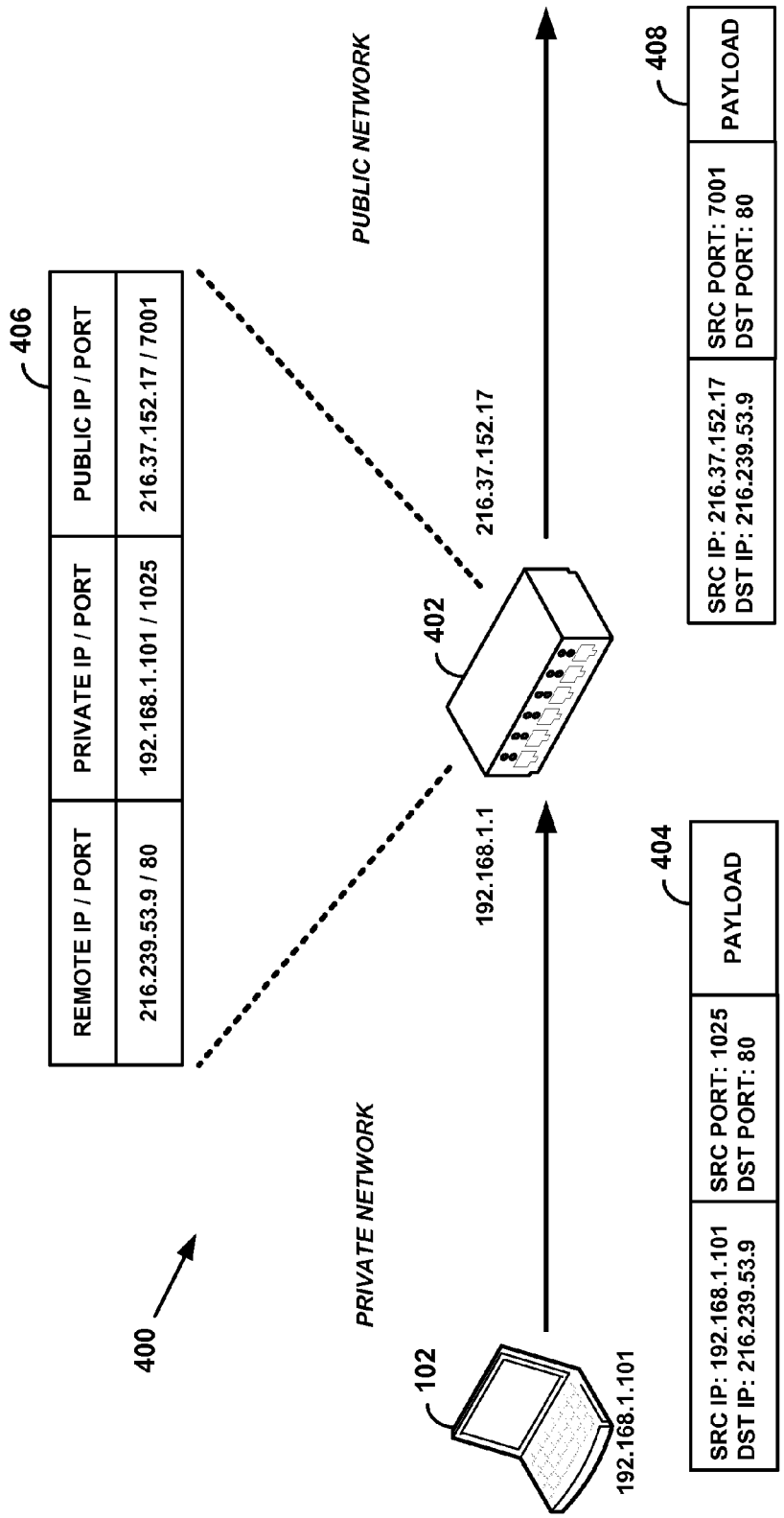
FIG. 4A is a first message flow, in accordance with an example embodiment.
Figure 4B:
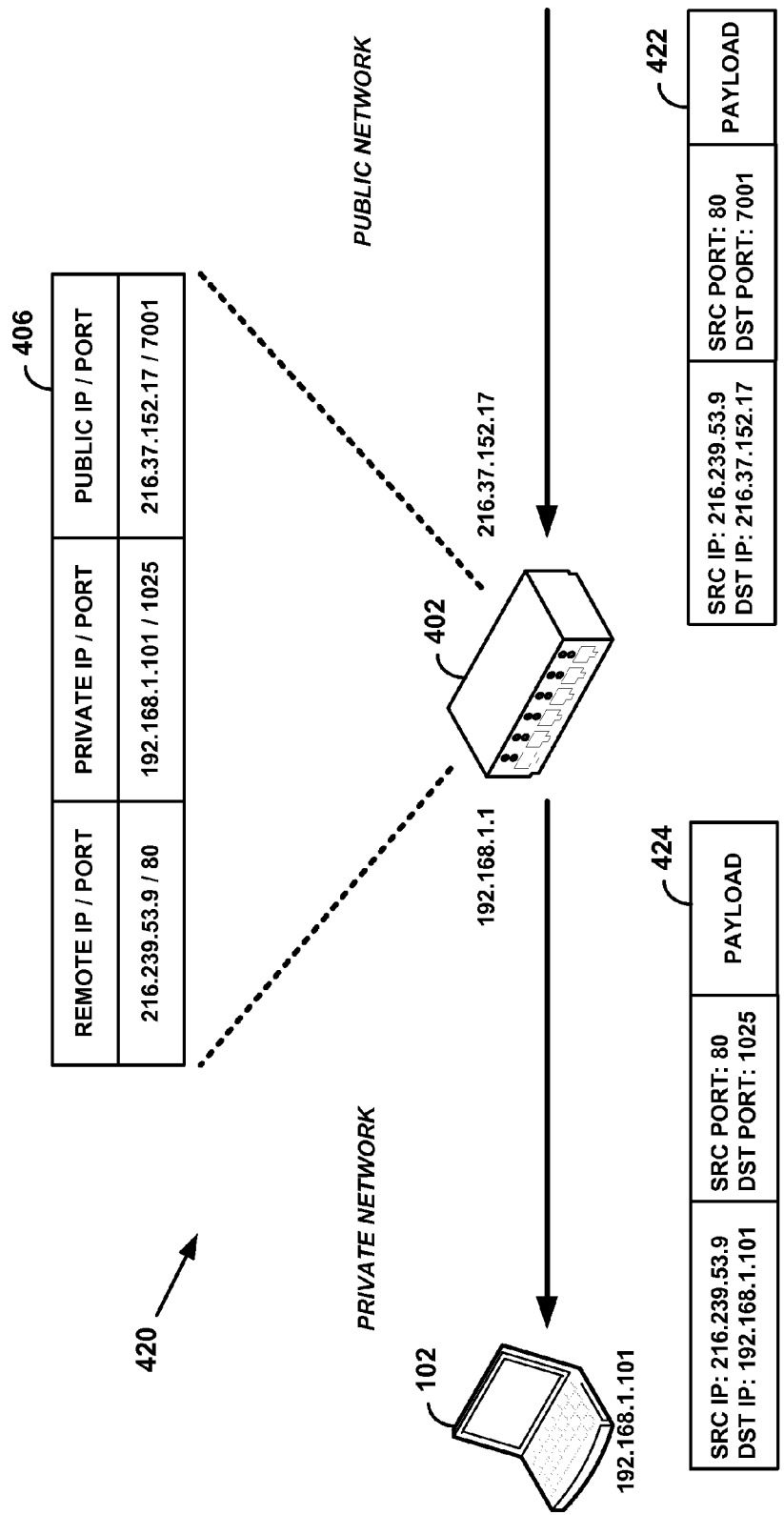
FIG. 4B is a second message flow, in accordance with an example embodiment.

FIGS. 4A and 4B provide illustrative examples of NAT operation for a packet transmitted by a client device and a packet transmitted to the client device, respectively. FIG. 4A provides example message flow 400, in which client device 102 is on a private network and assigned the private IP address 192.168.1.101. Client device 102 is coupled, via the private network, to NAT device 402. NAT device 402, in turn, is coupled to both the private network and a public network. Accordingly, NAT device 402 is assigned the private IP address 192.168.1.1 for communicating on the private network, and the public IP address 216.37.152.17 for communicating on the public network.

Client device 102 may transmit packet 404 to NAT device 402. Preferably, packet 404 contains the private IP address assigned to client device 102 (192.168.1.101) as a source address, and an IP address of a correspondent node (216.239.53.9) as a destination address. Additionally, packet 404 may contain a source port associated with client device 102 (1025) and a destination port associated with the correspondent node (80).

After receiving packet 404, NAT device 402 may create NAT mapping 406. Alternatively, if NAT mapping 406 was previously created (e.g., in response to NAT device 402 receiving an earlier packet in the same communication session to which packet 404 belongs), NAT device 402 may continue using NAT mapping 406. Regardless, NAT mapping 406 preferably contains a translation rule that associates the communication session as defined by the addresses and ports in packet 404 with a public IP address and a new port number (i.e., 216.37.152.17 and 7001, respectively) to use when translating the private IP address and source port of packet 404.

Accordingly, NAT device 402 may translate the headers in packet 404 to reflect the translation rule, and transmit packet 408, containing these translations, to the correspondent node. Thus, in FIG. 4A, packet 408 contains a source IP address of 216.37.152.17 (the public IP address of NAT device 402) and a source port of 7001.

NAT device 402 may maintain NAT mapping 406 for some period of time, so that the translation rule can be applied to further packets transmitted by or to client device 102. To this point, FIG. 4B provides example message flow 420. In this message flow, the correspondent node transmits packet 422 to NAT device 402. In comparison to packet 408, the source and destination IP addresses and port in packet 422 are reversed. Thus, in packet 422, the source IP address is 216.239.53.9 (that of the correspondent node), the destination IP address is 216.37.152.17 (the public IP address of NAT device 402), the source port is 80, and the destination port is 7001.

After receiving packet 422, NAT device 402 translates the destination address and destination port of packet 422 according to NAT mapping 406. Thus, the destination address is translated to 192.168.1.101 (the assigned private IP address of client device 102) and the destination port is changed to 1025 (the port used by client device 102 for this communication session). NAT device 402 then transmits translated packet 424 to client device 102.

It should be understood that when more than one client device is using the same shared public IP address via a NAT device, the NAT device may rely on the destination port number to map incoming packets from the public network to client devices. Thus, the NAT device may take steps to ensure that each client device sharing a given public IP address uses ports that do not overlap with other client devices sharing the given public IP address. Since each client device may select its respective client ports independently, the NAT device may have to translate some of these selections (as shown in FIGS. 4A and 4B) in order to avoid such an overlap. As a result, the number of ports per shared public IP address (e.g., 65536) is a factor that limits the number of client devices that can simultaneously make use of a public IP address.

In order to more efficiently use shared IP addresses, an address assignment device may attempt to assign private IP addresses to client devices that are likely to use relatively few ports concurrently. On the other hand, the address assignment device may attempt to assign a public IP address to client devices that are likely to use a relatively large number of ports concurrently. In this way, a greater number of client devices may be able to share each shared IP address.

III. Address Assignment

Figure 6:
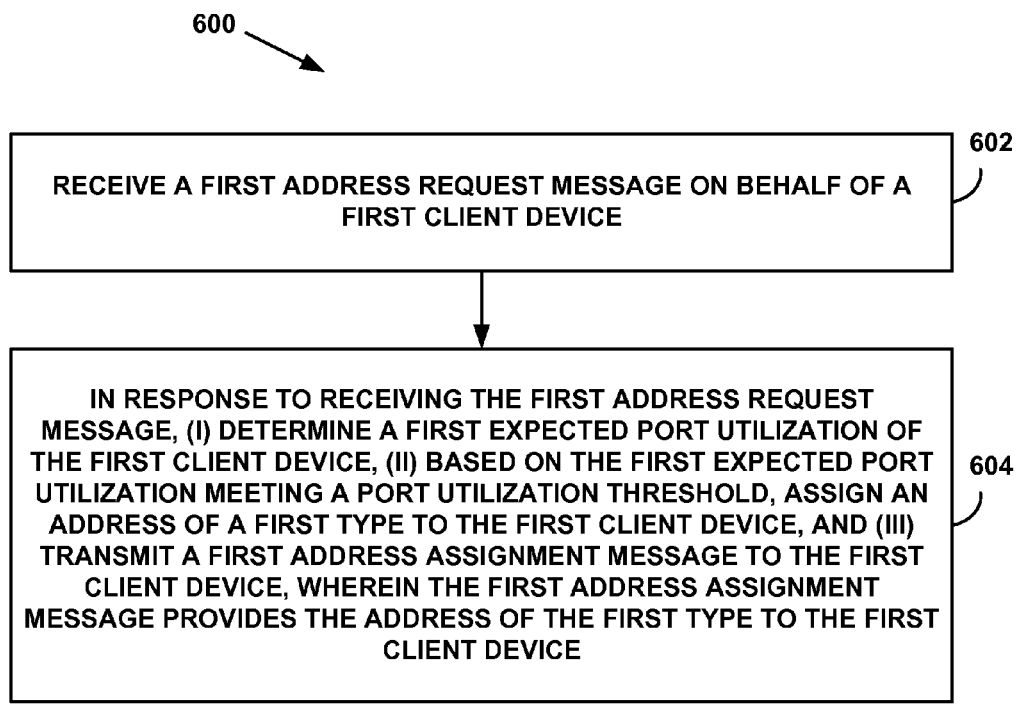
FIG. 6 is a first flow chart, in accordance with an example embodiment.

FIGS. 5, 6, and 7 depict example embodiments of address assignment to client devices. Each of these figures presents a somewhat different series of actions or events that may involve an address assignment device, a client device, and possibly a network routing device. Nevertheless, it should be understood that other embodiments not shown in these figures may fall within the scope of the invention.

Message flow 500 of FIG. 5 illustrates an example embodiment through which an address assignment device 504 may assign an address to client device 102 based on the client device's expected port utilization. At step 506, client device 102 may transmit an address assignment request to a network device 502. At step 508, network device 502, in turn, may forward the address assignment request to address assignment device 504.

In some embodiments, network device 502 and address assignment device 504 may be separate devices. For example, network device 502 may be a router and address assignment device 504 may be a DHCP server. Alternatively, network device 502 may be an access gateway and address assignment device 504 may be an AAA server. However, in other embodiments, network device 502 and address assignment device 504 may be part of the same logical or physical device. For instance, as shown by the dashed line surrounding network device 502 and address assignment device 504, a router or an access gateway could perform both the functions of network device 502 and address assignment device 504.

Regardless of the exact arrangement, at step 510, address assignment device 504 may assign an address to client device 102 based on an expected port utilization of client device 102. At step 512, in order to facilitate the assignment, address assignment device 504 may transmit an address assignment reply to network device 502, and at step 514, network device 502 may transmit the address assignment reply to client device 102. The address assignment reply may contain the address assigned to client device 102, and may additionally serve to confirm that client device 102 can use this address. Thus, at step 516, client device 102 may use the assigned address when communicating with other devices.

Preferably, address assignment device 504 maintains or has access to information regarding the expected port utilization of client device 102, and possibly other client devices as well. If the expected port utilization of client device 102 is high (e.g., meeting a port utilization threshold), address assignment device 504 may assign client device 102 a public address. However, if this expected port utilization is low (e.g., not meeting the port utilization threshold), address assignment device 504 may assign client device 102 a private IP address. This expected port utilization may be based on the historical port utilization of client device 102, such as past concurrent port utilization of client device 102, and/or other information that can be used to determine the expected future port utilization of client device 102. It should be understood that determining the expected port utilization of a client device may involve address assignment device 504 either reading a stored expected port utilization from memory, or calculating the expected port utilization based on other information (e.g., the historical port utilization of the client device).

Measuring the port utilization of client device 102 may take place when client device 102 is using the assigned address to communicate. Therefore, at step 518, network device 502 may read the network traffic (e.g., by sniffing or snooping on packets) flowing to and/or from client device 102 to determine this port utilization. In a possible embodiment, network device 502 may maintain a count of the number of concurrently-used client ports at client device 102. To that end, network device 502 may maintain a list of TCP and/or UDP ports in use by client device 102. Network device 502 may add a new port to this list when it observes client device 102 taking part in a transport-layer session that involves the new port (e.g., at the beginning of a transport-layer session). Conversely, network device 502 may remove a port from this list when network device 502 determines that client device 102 is no longer using the port. This determination may involve network device 502 observing that the transport-layer session involving the port has been torn down, or that this transport-layer session has not been used for a period of time.

Alternatively or additionally, network device 504 may not maintain a list of ports in use by client device 102. Instead, network device 504 may maintain a count of these ports. To that end, network device 504 may increment this count when it detects client device 102 taking part in a new transport-layer session, and network device 504 may decrement this count when it detects client device 102 has torn down or is no longer using a transport-layer session.

In this way, the number of ports being concurrently used by client device 102 may be determined. This number of ports may fluctuate, and various statistical measures of port utilization can be derived by sampling the number of ports over a period of time. Some of these statistical measures may include a maximum value (e.g., the most ports in concurrent use by client device 102), a mean value (e.g., the average number of ports in concurrent use by client device 102), and one or more percentile values (e.g., the number of ports in use at least n % of the time). These statistical measures or other statistical measures may be used to determine whether client device 102 is allocated a public address or a private address.

Additionally, address assignment device 504 may consider a client device's expected port utilization per transport-layer protocol. Thus, address assignment device 504 may separately determine the expected TCP port utilization and the expected UDP port utilization of the client device. Then, address assignment device 504 may then assign a public IP address or a private IP address to the client device based on these expected port utilizations. For instance, if either of the client device's expected TCP port utilization or expected UDP port utilization is high, address assignment device 504 may assign a public IP address to the client device. However, if both of these expected port utilizations are low, address assignment device 504 may assign a private IP address to the client device.

In the case that address assignment device 504 cannot determine an expected port utilization of client device 102 (e.g., address assignment device 504 has no access to a historical record of the port utilization of client device 102), address assignment device 504 may choose to assign client device 102 either a public or a private address by default. For instance, address assignment device 504 may be configured to assign a private address to client devices for which address assignment device 504 cannot determine an expected port utilization. Then, over time, address assignment device 504 may build up such a historical record so that, in the future, address assignment device 504 can assign the client device an address without falling back on a default rule.

Step 520 illustrates a way in which address assignment device 504 can determine an expected port utilization of a client device. From time to time, network device 502 may transmit the measured port utilization of client device 102 to address assignment device 504. Address assignment device 504 may, in turn, use these measurements to update the historical port utilization of client device 102. As a result, address assignment device 504 may determine a more accurate expected port utilization based on this historical port utilization.

FIG. 6 is a flow chart 600 of an embodiment that may be carried out by an access gateway device that, directly or indirectly, carries out address assignment procedures. The access gateway device may be, for example, a router or a wireless access gateway such as a mobile-IP home agent.

At step 602, the access gateway device may receive a first address request message sent on behalf of a first client device. The access gateway device may receive the first address request directly from the first client device, or indirectly via another device serving as an intermediary between the first client device and the access gateway device. The first address request message may take the form of a DHCP message (e.g., a DHCPREQUEST), a mobile-IP message (e.g., a mobile-IP registration request), a Point-to-Point Protocol (PPP) message (e.g., an IP Control Protocol Configuration Request), or a message formatted according to any other protocol that can facilitate address assignments.

At step 604, in response to receiving the first address request message, the access gateway device may determine a first expected port utilization of the first client device. Based on this first expected port utilization meeting a port utilization threshold (e.g., the first expected port utilization being greater than or equal to the port utilization threshold), the access gateway device may assign an address of a first type to the first client device, and transmit a first address assignment message to the first client device.

Preferably, the first address assignment message provides the address of the first type to the first client device. The first address assignment message may take the form of a DHCP message (e.g., a DHCPACK), a mobile-IP message (e.g., a mobile-IP registration reply), a Point-to-Point Protocol (PPP) message (e.g., an IP Control Protocol Configuration Acknowledgement), or a message formatted according to any other protocol that can facilitate address assignments.

Additionally, but not shown in FIG. 6, the access gateway device may receive a second address request message sent on behalf of a second client device. In response to receiving the second address request message, the access gateway device may determine a second expected port utilization of the second client device. Based on the second expected port utilization not meeting the port utilization threshold (e.g., the second expected port utilization being less than the port utilization threshold), the access gateway device may assign an address of a second type to the second client device, and transmit a second address assignment message to the second client device. Like the first address assignment message, the second address assignment message may provide the address of the second type to the second client device.

The first type of address may be a public address (e.g., a public IP address) and the second type of address may be a private address (e.g., a private IP address). Accordingly, the access gateway device may transmit communications from the second client device through a NAT that translates the address of the second type to a shared public address. However, the access gateway device may refrain from transmitting communications from the first client device through the NAT.

Preferably, the first expected port utilization includes a number of transport-layer ports that the first client device is expected to concurrently use while served by the access gateway device. Similarly, the second expected port utilization may include a number of transport-layer ports that the second client device is expected to concurrently use while served by the access gateway device. The first and second expected port utilizations may be based on the respective historical concurrent port utilizations of the first and second client devices.

In order to keep these historical port utilizations up to date, the access gateway device may measure the concurrent port utilization of the first client device and/or the second client while either of these devices is served by the access gateway device. Then, the access gateway device may use each of these client devices' measured concurrent port utilizations to update the historical concurrent port utilizations of each respective client device. As described above, measuring the concurrent port utilization of a client device may involve the access gateway device analyzing ports used in packets transmitted to or from the client device.

FIG. 7 is a flow chart 700 of another embodiment that may be carried out by an address assignment device, such as an access gateway, AAA server, home agent, or DHCP server. The address assignment device may incorporate router or access gateway functionality.

At step 702, the address assignment device may receive an address request message. The sender of the address request message may be seeking an address assignment for a client device. Thus, the sender may be the client device itself, or another device, such as an access gateway device or router.

At step 704, in response to receiving the address request message, the address assignment device may determine an expected port utilization of the client device. This expected port utilization may be based on a historical concurrent port utilization of the client device. The address assignment device may receive the expected port utilization from a network routing device that measures the concurrent port utilization of the client device. Regardless of the arrangement, the address assignment device may use the measured concurrent port utilization to update the expected concurrent port utilization.

At step 706, the address assignment device may determine whether the expected port utilization meets a port utilization threshold. If the expected port utilization meets the port utilization threshold, the address assignment device may assign an address of a first type to the client device at step 708. However, if the expected port utilization does not meet the port utilization threshold, the address assignment device may assign an address of a second type to the client device at step 710. Then, at step 712, the address assignment device may transmit an address assignment message to the sender of the address request message. Preferably, the address assignment message provides the assigned address to the client device.

As the case for the embodiment illustrated by flow chart 600, the address of the first type may include a public IP address, and the address of the second type may include a private IP address. Also, in possible embodiments, the address assignment device may comprise a mobile-IP home agent, the address request message may comprise a mobile-IP registration request, and the address assignment message may comprise a mobile-IP registration reply. Alternatively or additionally, the address assignment device may comprise a DHCP server, the address request message may comprise a DHCPREQUEST message, and the address assignment message may comprise a DHCPACK message. In another alternative or additional embodiment, the address assignment device may comprise an access gateway, the address request message may comprise an IP Control Protocol Configuration Request message, and the address assignment message may comprise an IP Control Protocol Configuration Acknowledgement message.

It should be understood that the devices, methods, process, and functions depicted in FIGS. 5, 6, and 7 are presented for purposes of illustration. Thus, each of message flow 500, flow chart 600, and flow chart 700 may contain more or fewer steps, and these steps may take place in different orders than shown. Additionally, message flow 500, flow chart 600, and flow chart 700 may be combined with one another, in part or in whole, without departing from the scope of the invention.

IV. Conclusion

Example embodiments have been described above. Those skilled in the art will understand, however, that changes and modifications may be made to these embodiments without departing from the true scope and spirit of the invention, which is defined by the claims.

What is claimed is:

1. A method, performed by an access gateway device that assigns addresses to client devices for the client devices to use while communicating via the access gateway device, the method comprising:

the access gateway device receiving a first address request message sent on behalf of a first client device; and in response to receiving the first address request message, the access gateway device (i) determining a first expected transport-layer port utilization of the first client device, wherein the first expected transport-layer port utilization comprises a number of transport-layer ports that the first client device is expected to concurrently use while served by the access gateway device, (ii) based on the first expected transport-layer port utilization meeting a transport-layer port utilization threshold, assigning an address of a first type to the first client device, and (iii) transmitting a first address assignment message to the first client device, wherein the first address assignment message provides the address of the first type to the first client device the access gateway device receiving a second address request message sent on behalf of a second client device;

in response to receiving the second address request message, the access gateway device (i) determining a second expected transport-layer port utilization of the second client device, (ii) based on the second expected transport-layer port utilization not meeting the transport-layer port utilization threshold, assigning an address of a second type to the second client device, and (iii) transmitting a second address assignment message to the second client device, wherein the second address assignment message provides the address of the second type to the second client device, wherein the first type comprises a public address and the second type comprises a private address; and the access gateway device (i) transmitting communications from the second client device through a network address translator (NAT) that translates the address of the second type to a shared public address, and (ii) refraining from transmitting communications from the first client device through the NAT.

2. The method of claim 1, wherein the address of the first type comprises a public Internet Protocol (IP) address.

3. The method of claim 1, wherein the first expected transport-layer port utilization is based on the historical concurrent transport-layer port utilization of the first client device.

4. The method of claim 3, further comprising:
while the first client device is served by the access gateway device, the access gateway device measuring the concurrent transport-layer port utilization of the first client device; and
the access gateway device using the measured concurrent transport-layer port utilization to update the historical concurrent transport-layer port utilization.

5. The method of claim 4, wherein measuring the concurrent transport-layer port utilization of the first client device comprises the access gateway device analyzing ports used in packets transmitted to or from the first client device.

6. The method of claim 1, wherein the access gateway device comprises a mobile Internet Protocol (IP) home agent, the first address request message comprises a mobile-IP registration request, and the first address assignment message comprises a mobile-IP registration reply.

7. A method, performed by an address assignment device that assigns addresses to client devices for the client devices to use while communicating, the method comprising:
the address assignment device receiving an address request message, wherein a sender of the address request message seeks an address assignment for a client device;
in response to receiving the address request message, the address assignment device determining an expected transport-layer port utilization of the client device, wherein the expected transport-layer port utilization is based on a concurrent transport-layer port utilization of the client device;
if the expected transport-layer port utilization meets a transport-layer port utilization threshold, the address assignment device assigning an address of a first type to the client device;
if the expected transport-layer port utilization does not meet the transport-layer port utilization threshold, the address assignment device assigning an address of a second type to the client device, wherein the first type comprises a public address and the second type comprises a private address; and
the address assignment device transmitting an address assignment message to the sender of the address request message, wherein the address assignment message provides the assigned address to the client device;
if the assigned address is of the second type, transmitting communications from the client device through a network address translator (NAT) that translates the address of the second type to a shared public address; and
if the assigned address is of the first type, refraining from transmitting communications from the client device through the NAT.

8. The method of claim 7, wherein the client device communicates via a network routing device that measures the concurrent transport-layer port utilization of the client device, and wherein the address assignment device determining an expected transport-layer port utilization of the client device comprises the address assignment device receiving the measured concurrent transport-layer port utilization from the network routing device.

9. The method of claim 8, wherein the address assignment device comprises the network routing device.

10. The method of claim 8, further comprising:
the address assignment device using the measured concurrent transport-layer port utilization to update the expected transport-layer port utilization.

11. The method of claim 7, wherein the address of the first type comprises a public Internet Protocol (IP) address, the address of the second type comprises a private IP address.

12. The method of claim 7, wherein the address assignment device comprises a mobile Internet Protocol (IP) home agent, the address request message comprises a mobile-IP registration request, and the address assignment message comprises a mobile-IP registration reply.

13. An address assignment device that assigns addresses to client devices for the client devices to use while communicating, the address assignment device comprising:
a processor;
a data storage; and
program instructions, stored in the data storage and executable by the processor, to (i) receive an address request message, wherein a sender of the address request message seeks an address assignment for a client device, (ii) in response to receiving the address request message, determine an expected transport-layer port utilization of the client device, wherein the expected transport-layer port utilization is based on a concurrent transport-layer port utilization of the client device, (iii) if the expected transport-layer port utilization meets a port utilization threshold, assign an address of a first type to the client device, (iv) if the expected transport-layer port utilization does not meet the transport-layer port utilization threshold, assign an address of a second type to the client device, wherein the first type comprises a public address and the second type comprises a private address, and (v) transmit an address assignment message to the client device, wherein the address assignment message provides the assigned address to the sender of the address request message, (vi) if the assigned address is of the second type, transmit communications from the client device through a network address translator (NAT) that translates the address of the second type to a shared public address, and (vii) if the assigned address is of the first type, refrain from transmitting communications from the client device through the NAT.

14. The address assignment device of claim 13, wherein the client device communicates via a network routing device that measures the concurrent transport-layer port utilization of the client device, and wherein the program instructions to determine the expected transport-layer port utilization of the client device comprise program instructions to receive the measured concurrent transport-layer port utilization from the network routing device.

15. The address assignment device of claim 14, further comprising the network routing device.

16. The address assignment device of claim 14, further comprising:
program instructions, stored in the data storage and executable by the processor, to use the measured concurrent transport-layer port utilization to update the expected transport-layer port utilization.

* * * * *